United States Patent

Adachi et al.

[11] Patent Number: 6,067,493
[45] Date of Patent: May 23, 2000

[54] SPEED CHANGE RATIO CONTROLLER FOR CONTINUOUSLY VARIABLE TRANSMISSION

[75] Inventors: Kazutaka Adachi, Yokohama; Hiroyuki Ashizawa, Fujisawa, both of Japan

[73] Assignee: Nissan Motor Co., Ltd., Yokohama, Japan

[21] Appl. No.: 09/021,149

[22] Filed: Feb. 10, 1998

[30] Foreign Application Priority Data

Feb. 10, 1997 [JP] Japan .................................. 9-026656

[51] Int. Cl.⁷ .................................................. B60K 41/04
[52] U.S. Cl. .................................. 701/51; 477/34; 477/68
[58] Field of Search ............................. 701/51; 477/34, 477/68

[56] References Cited

U.S. PATENT DOCUMENTS

| | | | |
|---|---|---|---|
| 4,976,169 | 12/1990 | Sasajima et al. | 60/449 |
| 5,001,900 | 3/1991 | Sasajima et al. | 60/327 |
| 5,014,574 | 5/1991 | Sasajima et al. | 477/68 |
| 5,101,689 | 4/1992 | Yamaguchi et al. | 60/449 |
| 5,166,877 | 11/1992 | Ishikawa et al. | 701/51 |
| 5,211,081 | 5/1993 | Bota et al. | 477/121 |
| 5,445,579 | 8/1995 | Fujita et al. | 477/156 |
| 5,646,824 | 7/1997 | Schulz et al. | 701/51 |
| 5,809,442 | 9/1998 | Schulz et al. | |
| 5,857,161 | 1/1999 | Zeilinger et al. | 701/51 |
| 5,931,884 | 8/1999 | Ochiai | 701/51 |

FOREIGN PATENT DOCUMENTS 61-105353 5/1986 Japan .
8-178055 7/1996 Japan .

*Primary Examiner*—William A. Cuchlinski, Jr.
*Assistant Examiner*—Olga Hernandez
*Attorney, Agent, or Firm*—Foley & Lardner

[57] ABSTRACT

In a speed change ratio controller of a continuously variable transmission, a speed change ratio varying mechanism which varies a speed change ratio and a speed change ratio servo device which controls this speed change ratio varying mechanism according to a signal from a microprocessor, are provided. The microprocessor sets a final speed change ratio according to the vehicle traveling conditions, and computes a deviation between the final speed change ratio and target speed change ratio. A target dynamic characteristic parameter of the speed change ratio is set according to this deviation, and the target speed change ratio and a command speed change ratio are computed based on the final speed change ratio and target dynamic characteristic parameter. By outputting the command speed change ratio obtained in this way as a signal to the speed change ratio servo device, high response speed change ratio control is achieved.

7 Claims, 7 Drawing Sheets

S1: WATER TEMP. SENSOR
S2: THROTTLE OPENING SENSOR
S3: ENGINE SPEED SENSOR
S4: ABS OPERATION SENSOR
S5: BRAKE SWITCH
S6: INHIBITOR SWITCH
S7: ROTATION SPEED SENSOR
S8: ROTATION SPEED SENSOR
112: CONTROL VALVE
113: STEP MOTOR
114: LINK
115: LINE PRESSURE SOLENOID
116: MODIFIER
117: REGULATOR
118: LOCKUP SOLENOID
119: LOCKUP CONTROL VALVE
120: MANUAL CONTROL VALVE

S1: WATER TEMP. SENSOR
S2: THROTTLE OPENING SENSOR
S3: ENGINE SPEED SENSOR
S4: ABS OPERATION SENSOR
S5: BRAKE SWITCH
S6: INHIBITOR SWITCH
S7: ROTATION SPEED SENSOR
S8: ROTATION SPEED SENSOR
112: CONTROL VALVE
113: STEP MOTOR
114: LINK
115: LINE PRESSURE SOLENOID
116: MODIFIER
117: REGULATOR
118: LOCKUP SOLENOID
119: LOCKUP CONTROL VALVE
120: MANUAL CONTROL VALVE

SPEED CHANGE RATIO CONTROLLER FOR CONTINUOUSLY VARIABLE TRANSMISSION

The contents of Tokugan Hei 9-26656, with a filing date of Feb. 10, 1977, in Japan, are hereby incorporated by reference.

FIELD OF THE INVENTION

This invention relates to control of a continuously variable transmission for a vehicle, and in particular to improvement of the response characteristics of speed change control of the transmission.

BACKGROUND OF THE INVENTION

A system which transmits an engine output of a vehicle to a vehicle drive shaft via a torque converter or fluid coupling and a continuously variable transmission is disclosed for example in Tokkai Sho 61-105353 published by the Japanese Patent Office in 1986.

In this system, a target speed change ratio is set based on engine running conditions such as engine load and vehicle speed, and feedback control is performed so that the speed change ratio of the continuously variable transmission coincides with a target speed change ratio.

In this continuously variable transmission, a drive pulley and driven pulley are connected by a V- belt, the contact radius between the V-belt and the pulleys being varied by varying the groove width of the pulleys in contact with the V-belt. The groove width of the pulleys varies according to an oil pressure, so the speed change ratio can be varied by controlling the oil pressure. Oil pressure control is performed via a step motor which responds to an output signal from a control unit comprising a microcomputer, and an oil pressure control valve driven by the step motor.

In such a device, the ability of the real speed change ratio to follow or track the target speed change ratio, is determined by the response characteristics of a speed change ratio varying mechanism comprising the step motor and oil pressure control valve, but the desired tracking characteristics are not necessarily obtained.

Therefore, in a transient state when the speed change ratio is varying, overshoot may occur wherein the real engine speed exceeds the target engine rotation speed, and fuel consumption of the engine is adversely affected by this overshoot.

SUMMARY OF THE INVENTION

It is therefore an object of this invention to enhance the response characteristics of a continuously variable transmission so as to suppress overshoot of the engine rotation speed.

In order to achieve the above object, this invention provides a speed change ratio controller for use with a continuously variable transmission of a vehicle. The controller comprises a speed change ratio varying mechanism for varying a speed change ratio of the continuously variable transmission, a speed change ratio servo device for controlling the speed change ratio varying mechanism according to an input signal, and a microprocessor.

The microprocessor is programmed to set a final speed change ratio according to a vehicle traveling condition, compute a deviation between the final speed change ratio and a target speed change ratio, set a target dynamic characteristic parameter according to the deviation so as to make the real speed change ratio coincide with the final speed change ratio, compute the target speed change ratio and a command speed change ratio based on the final speed change ratio and the target dynamic characteristic parameter, and output a signal corresponding to the command speed change ratio to the speed change ratio servo circuit.

It is preferable that the microprocessor is further programmed to compute the target speed change ratio and command speed change ratio based on the final speed change ratio, the target dynamic characteristic parameter and transmission characteristics of the speed change ratio servo device.

It is also preferable that the microprocessor is further programmed to compute the command speed change ratio by multiplying a filter value specified by the following equation, by the final speed change ratio:

$$Gc(s) = \frac{T_T \cdot s + 1}{T_O \cdot s + 1}$$

where Gc(s)=filter value,
$T_T$=constant expressing transmission characteristics of speed change ratio servo device,
$T_O$=target dynamic characteristic parameter,
s=differential operator.

It is also preferable that the microprocessor is further programmed to set the target dynamic characteristic parameter to a larger value during a speed change toward downshift than during a speed change toward upshift, for an identical deviation.

It is also preferable that the microprocessor is further programmed to calculate the final speed change ratio by dividing a target input rotation speed of the transmission by a real output rotation speed of the transmission.

It is further preferable that the speed change ratio controller further comprises a sensor for detecting a vehicle travel speed, and the microprocessor is further programmed to calculate the real output rotation speed by multiplying a predetermined constant by the vehicle travel speed.

This invention also provides a speed change ratio controller comprising a speed change ratio varying mechanism for varying a speed change ratio of the continuously variable transmission, a speed change ratio servo device for controlling the speed change ratio varying mechanism according to an input signal, a mechanism for setting a final speed change ratio according to a vehicle traveling condition, a mechanism for computing a deviation between the final speed change ratio and a target speed change ratio, a mechanism for setting a target dynamic characteristic parameter according to the deviation so as to make the real speed change ratio coincide with the final speed change ratio, a mechanism for computing the target speed change ratio and a command speed change ratio based on the final speed change ratio and the target dynamic characteristic parameter, and a mechanism for outputting a signal corresponding to the command speed change ratio to the speed change ratio servo circuit The details as well as other features and advantages of this invention are set forth in the remainder of the specification and are shown in the accompanying drawings.

DESCRIPTION OF THE PREFERRED EMBODIMENTS

Figure 1:
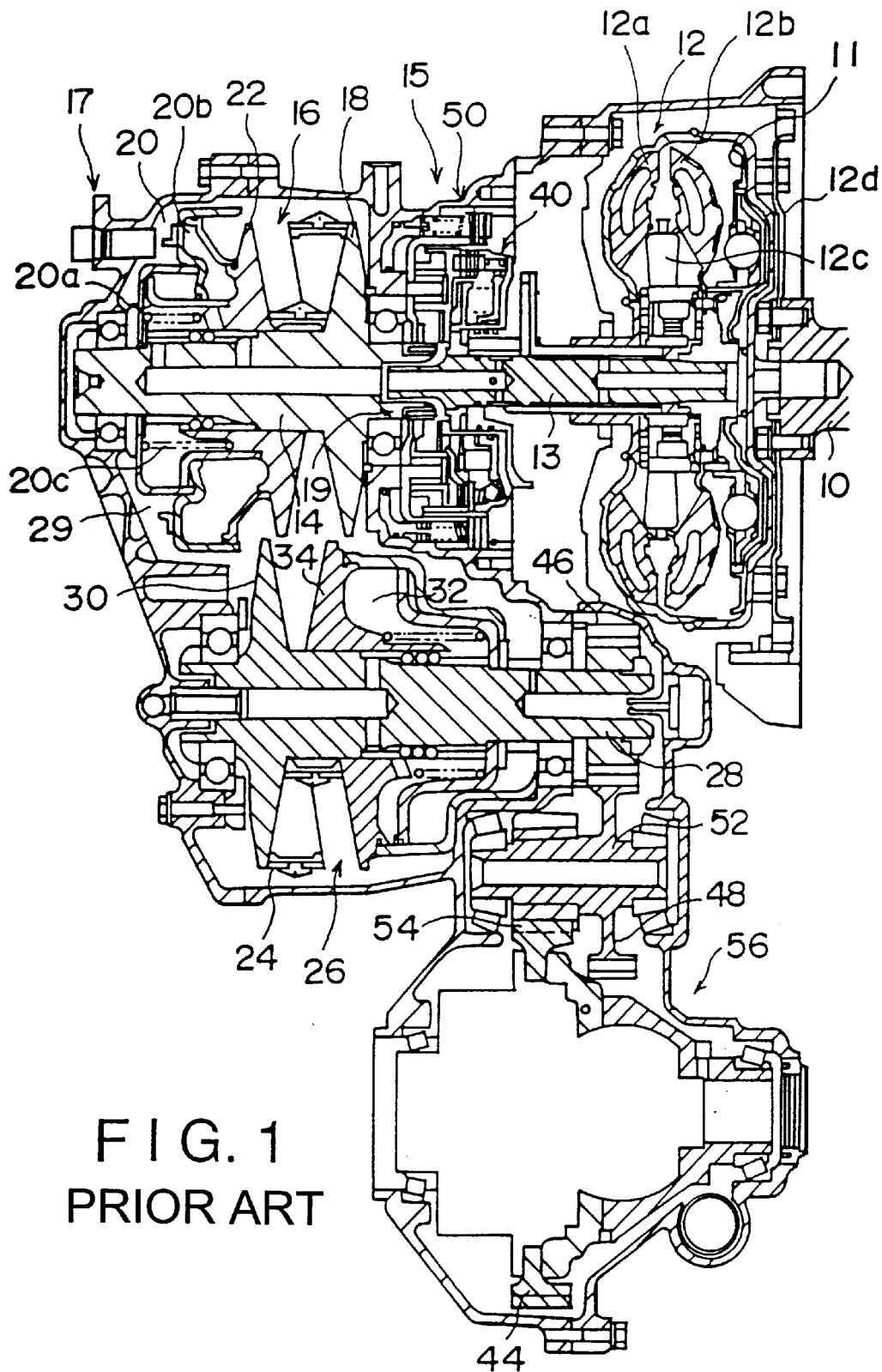
FIG. 1 is a vertical sectional view of a continuously variable transmission to which this invention is applied.

Referring to FIG. 1 of the drawings, a torque converter 12 is connected to an engine output shaft 10.

The torque converter 12 comprises a lockup clutch 11. The lockup clutch 11 mechanically connects or disconnects an impeller 12a which is an input part and a turbine 12b which is an output part according to the oil pressure supplied to a converter chamber 12c and a lockup oil chamber 12d.

The turbine 12b is connected to a rotation shaft 13, the rotation shaft 13 being connected to a forward/reverse change-over mechanism 15. The mechanism 15 comprises a planetary gear mechanism 19, forward clutch 40 and reverse brake 50. The output shaft of the mechanism 19 is connected to a drive shaft 14 formed coaxially with the rotation shaft 13. The drive shaft 14 comprises the input shaft of a continuously variable transmission (CVT) 17. It should be noted that a fluid coupling or an electromagnetic clutch may be used instead of the torque converter 12.

The CVT 17 comprises a drive pulley 16 and driven pulley 26, and a V-belt 24 which transmits the rotation of the drive pulley 16 to the driven pulley 26, as described hereinabove.

The drive pulley 16 comprises a fixed conical plate 18 which rotates together with the drive shaft 14 and a movable conical plate 22 disposed relative to the fixed conical plate 18 forming a V-shaped pulley groove with the fixed conical plate 18. The movable conical plate 22 moves in the axial direction of the drive shaft 14 according to an oil pressure acting on a drive pulley cylinder chamber 20 while it rotates with the fixed conical plate 18. The drive pulley cylinder chamber 20 comprises a chamber 20a and chamber 20b. The movable conical plate 22 has a pressure receiving surface larger that of a movable conical plate 34 described hereinafter.

The driven pulley 26 is installed on a driven shaft 28. The driven pulley 26 comprises a fixed conical plate 30 which rotates together with the driven shaft 28 and a movable conical plate 34 disposed relative to the fixed conical plate 30 forming a V-shaped pulley groove with the fixed conical plate 30. The movable conical plate 34 moves in the axial direction of the driven shaft 28 according to an oil pressure acting on a driven pulley cylinder chamber 32 while it rotates with the fixed conical plate 30.

The driven pulley 26 is provided with a drive gear 46 which rotates together with the pulley 28. The drive gear 46 engages with an idler gear 48 on an idler shaft 52. The idler shaft 52 comprises a pinion gear 54 which rotates together with the shaft 52. The pinion gear 54 engages with a final gear 44. The final gear 44 drives a propeller shaft or drive shaft, not shown, via a differential unit 56.

The rotation input to the CVT 17 from the engine output shaft 10 is transmitted to the forward/reverse change-over mechanism 15 via the torque converter 12 and rotation shaft 13. When the forward clutch 40 is engaged and the reverse brake 50 is released, the rotation of the rotation shaft 13 is transmitted to the drive shaft 14 of the transmission 17 with the same rotation direction via the planetary gear mechanism 19 whereof the input shaft and output shaft rotate together. On the other hand, when the forward clutch 40 is released and the reverse brake 50 is engaged, the rotation of the rotation shaft 13 is transmitted to the drive shaft 14 with the opposite rotation direction due to the action of the planetary gear mechanism 19.

The rotation of the drive shaft 14 is transmitted to the differential unit 56, drive pulley 16, V-belt 24, driven pulley 26, driven shaft 28, drive gear 46, idler gear 48, idler shaft 52, pinion gear 54 and final gear 44. When the forward clutch 40 and reverse brake 50 are both released, the forward/reverse change-over mechanism 15 goes into neutral, and transmission of a rotation from the rotation shaft 13 to the drive shaft 14 does not occur.

In the aforesaid power transmission, the rotation ratio, i.e. speed change ratio (deceleration ratio) between the drive pulley 16 and driven pulley 26 varies when the movable conical plate 22 of the drive pulley 16 and movable conical plate 34 of the driven pulley 26 are moved in axial direction so as to alter the contact point radius with the V-belt 24. For example, if the width of the V-shaped pulley groove of the drive pulley 16 is enlarged and the width of the V-shaped pulley groove of the driven pulley 26 is narrowed, the contact point radius of the V-belt 24 on the side of the drive pulley 16 decreases and the contact point radius of the V-belt 24 on the side of the driven pulley 24 increases, so a large deceleration ratio is obtained. When the movable conical plates 22, 34 are moved in the opposite direction, the deceleration ratio becomes smaller.

This control of the widths of the V-shaped pulley grooves of the drive pulley 16 and driven pulley 26 is performed by controlling the relative pressures of the drive pulley cylinder chamber 20 (20a, 20b) and driven pulley cylinder chamber 32 via a control system described hereinafter.

Figure 2:
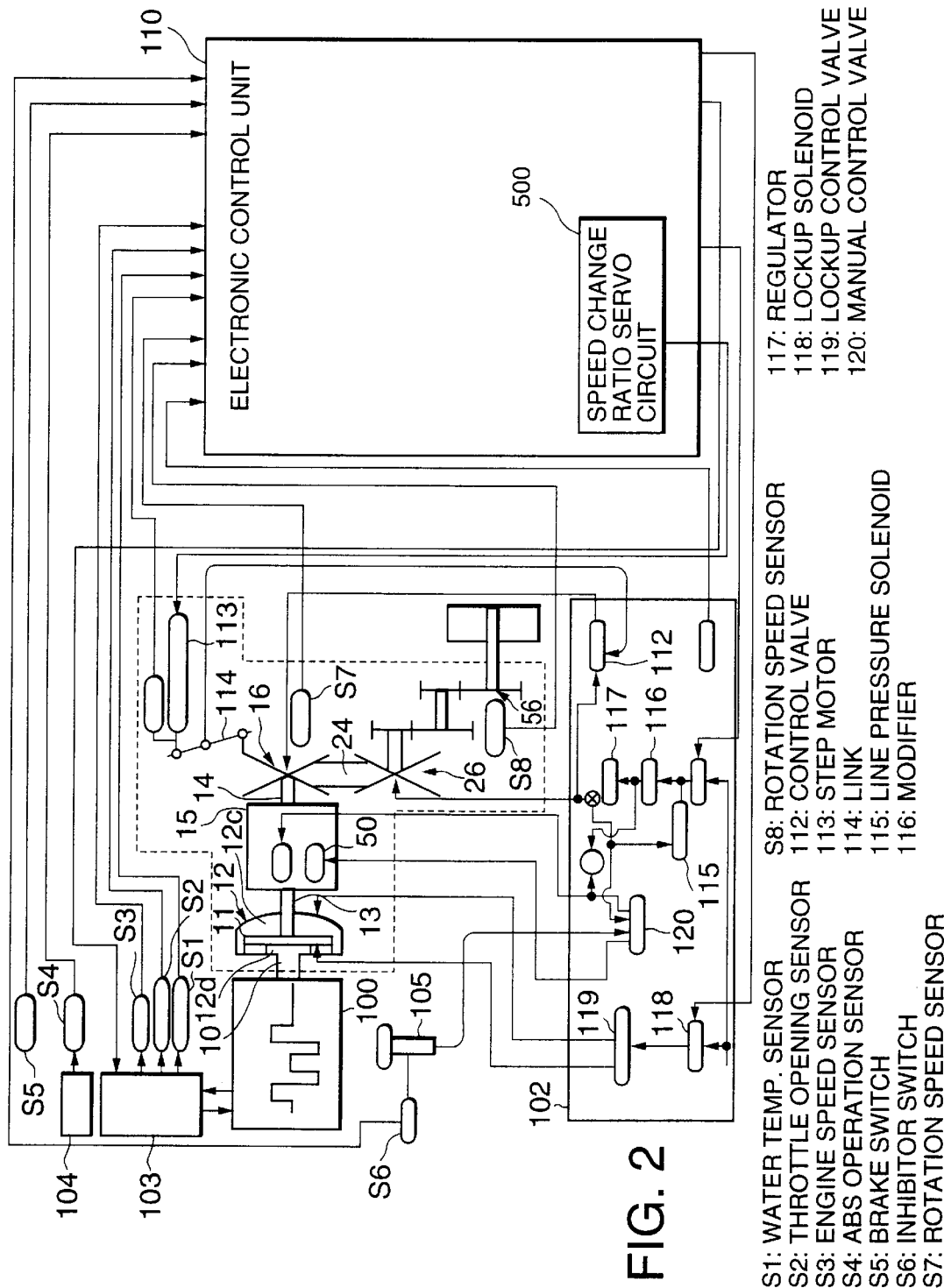
FIG. 2 is a schematic diagram of a speed change ratio controller according to this invention.

The rotation ratio of the CVT 17 is controlled by a control system shown in FIG. 2. The same symbols are used as for the mechanism in FIG. 1.

In FIG. 2, 110 is an electronic control unit comprising a microprocessor, and 102 denotes a hydraulic control unit comprising various oil pressure control valves.

The electronic control unit 110 is a microcomputer comprising a central processing unit (CPU), read-only memory (ROM), random access memory (RAM) and an I/O interface.

Signals from a water temperature sensor S1, throttle opening sensor S2, engine rotation speed sensor S3, ABS operation sensor S4 which detects an operation of an antilock brake system (ABS) controller 104, braking sensor S5 which detects braking of the vehicle, inhibitor switch S6 showing the operating position of a selector switch 105, rotation speed sensor S7 which detects the rotation speed of the drive pulley 16, and rotation speed sensor S8 which detects the rotation speed of the driven pulley 26 are input to the electronic control unit 110. Since the rotation speed of the driven pulley 26 is equivalent to the vehicle speed, the rotation speed sensor S8 also serves as a vehicle speed sensor.

The electronic control unit 110 performs predetermined calculations on these signals to control the speed change ratio of the CVT 17, the line pressure and the lockup clutch 11.

Describing these functions in detail, the electronic control unit 110 outputs a drive signal to a step motor 113 so that speed change is performed according to a predetermined pattern depending on the engine load and engine rotation speed represented by the throttle opening, and the vehicle speed. The throttle opening is detected by the throttle opening sensor S2, the engine rotation speed is detected by the engine rotation speed sensor S3, and the vehicle speed is detected by the rotation speed sensor S8 which detects the rotation speed of the driven pulley 26.

The step motor 113 drives a speed change control valve 112 of a hydraulic control unit 102 so as to obtain a speed change ratio corresponding to this drive signal. The pressures of the drive pulley cylinder chamber 20 and driven pulley cylinder chamber 32 are varied relative to each other by controlling the line pressure supplied to the drive pulley cylinder chamber 20 shown in FIG. 1.

The displacement position of the drive pulley 16, i.e. the speed change ratio, is feedback controlled by the speed change control valve 112 via a link 114. After a target speed change ratio corresponding to the position of the step motor 113 is obtained, the electronic control unit 110 fixes the relative pressure of the pulley cylinder chambers 20, 32 so as to maintain the target speed change ratio.

In this speed change control of the CVT 17, when the line pressure of the pulleys 16, 26 is too small, the frictional force between the pulleys 16, 18 and V-belt 24 is insufficient so that slip occurs. Conversely, when the line pressure is too large, the frictional force becomes excessively large. In either case, there is an adverse effect on the fuel consumption and power performance of the vehicle. The line pressure is therefore controlled so that the power transmitted is neither excessive nor deficient according to the driving conditions.

In other words, the electronic control unit 110 controls the position of the line pressure solenoid 115 of the oil pressure control unit 102 by the control signal output. The line pressure solenoid 115 supplies oil pressure from a hydraulic pump, not shown, to the driven pulley chamber 32 after the pressure is adjusted to a suitable target line pressure via a modifier (pressure control valve) 116 and regulator (constant pressure valve) 117, and also supplies oil pressure to the drive pulley cylinder chamber 20 via the speed change control valve 112.

The lockup clutch 11 is engaged when for example the vehicle speed increases beyond a predetermined value, and disengaged when the vehicle speed falls to less than this predetermined value.

The electronic control unit 110 therefore outputs a signal to the lockup solenoid 118 of the oil pressure control unit 102 according to the vehicle speed, and the lockup control valve 119 is changed over accordingly. The lockup control valve 119 is a valve which changes over between a system which supplies the oil pressure of the hydraulic pump to a converter chamber 12c of the torque converter 12 as an applied pressure of the lockup clutch 11 while releasing a lockup oil chamber 12d, and a system which supplies the oil pressure of the hydraulic pump to the lockup oil chamber 12d as a release pressure while releasing the converter chamber 12c.

The oil pressure control unit 102 is further provided with a manual control valve 120 connected to a selector lever 105. The manual control valve 120 selectively supplies oil pressure obtained from the oil pressure pump via the line pressure solenoid 115, to a forward clutch 40 and a reverse brake 50 of a forward/reverse change-over mechanism 15 according to the operating position of the selector lever 105. In this way, the forward/reverse change-over mechanism 15 is changed over between the forward, reverse and neutral positions.

The above-mentioned CVT and the basic structure of its controller are disclosed in, for example, Tokkai Hei 8-178055 published by the Japanese Patent Office in 1996.

Next, the speed change ratio control performed by the electronic control unit 110 via the step motor 113 will be described.

The electronic control unit 110 calculates a target speed change ratio and command speed change ratio based on a rotation speed signal for the driven belt pulley 26 (vehicle speed signal) input by a rotation speed sensor S8, an engine rotation signal from an engine rotation speed sensor S3, a shift position signal from an inhibitor switch S6, and a throttle opening signal from a throttle opening sensor S2. The command speed change ratio is a command value of the speed change ratio for determining the output signal to the step motor 113.

The electronic control unit 110 comprises a speed change ratio servo circuit 500 for converting the calculated command speed change ratio into a pulse signal output to the step motor 113.

The electronic control unit 110 sets the command speed change ratio based on the dynamic characteristics of the target speed change ratio and dynamic characteristics of the speed change ratio servo circuit 500 so that the target speed change response is achieved.

Figure 3:
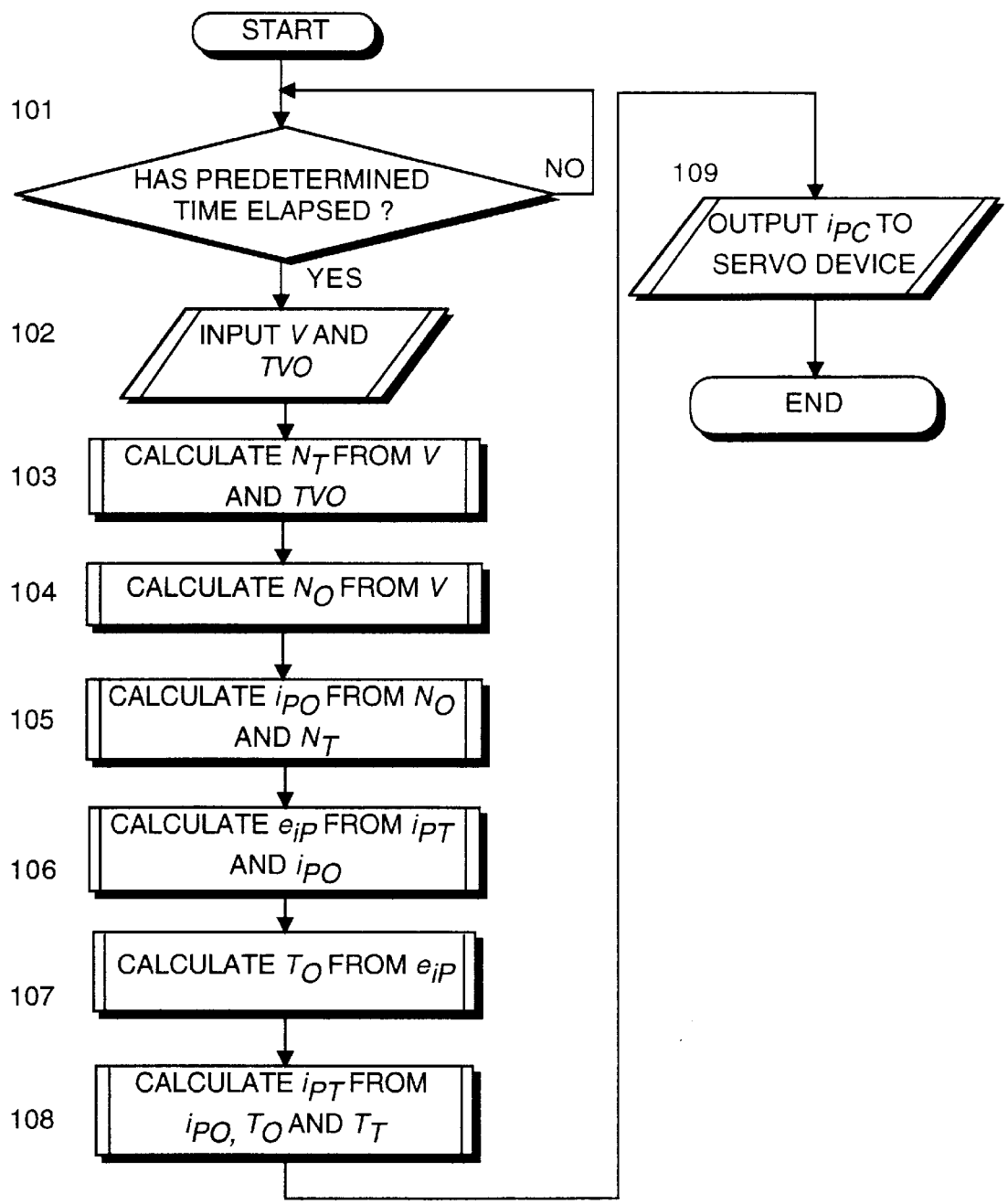
FIG. 3 is a flowchart for describing a control process of the speed change ratio controller.

This control process will be described referring to the flowchart of FIG. 3.

This process is performed at a predetermined interval. For this purpose, it is first determined in a step 101 whether or not a predetermined time has elapsed from the end of the process performed on the immediately preceding occasion, and only when this predetermined time has elapsed, the routine proceeds to a step 102 and subsequent steps.

In the step 102, the vehicle speed V and throttle opening TVO are read.

Figure 4:
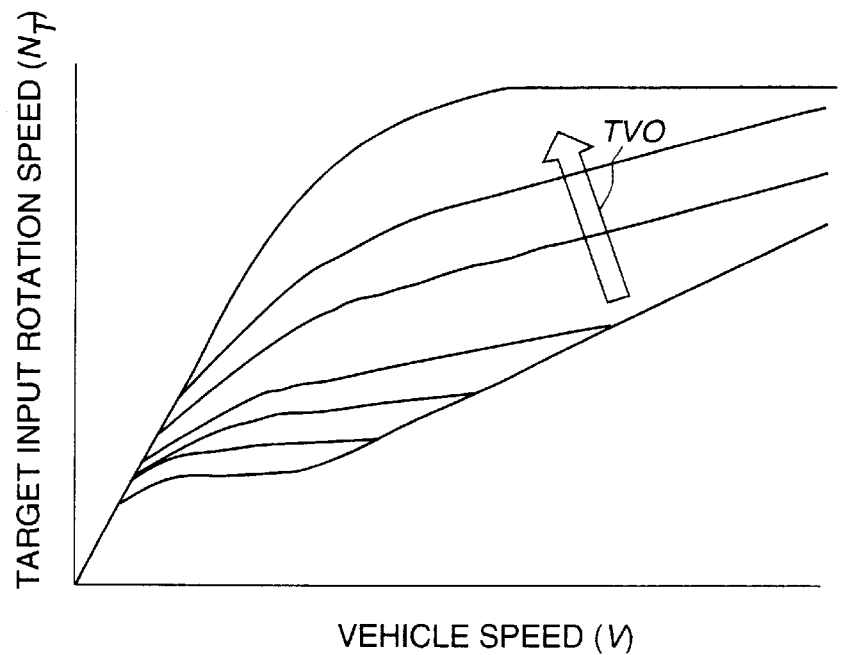
FIG. 4 is a diagram showing the contents of a map of a target input rotation speed $N_T$ with which the speed change ratio controller is provided.

In a step 103, a transmission target input rotation speed $N_T$ is found from the vehicle speed V and throttle opening TVO. For this purpose, a map shown in FIG. 4 is first stored in the electronic control unit 110, and the transmission target input rotation speed $N_T$ is found by looking up this map. Instead of the transmission target input rotation speed $N_T$, the target engine rotation speed may be used.

In a step 104, the vehicle speed V is multiplied by a fixed number ks so as to compute a transmission output rotation speed $N_O$.

In a step 105, the target input rotation speed $N_T$ is divided by the output rotation speed $N_O$ so as to compute a final speed change ratio $i_{PO}$.

In a step 106, a speed change ratio deviation $e_{iP}$ between the final speed change ratio $i_{PO}$ and a target speed change ratio $i_{PT}$, described hereafter, is computed.

In a step 107, a parameter $T_O$ representing target dynamic characteristics of the speed change ratio are determined from the deviation $e_{iP}$. This is actually a time constant expressing the speed change ratio variation rate when the real speed change ratio $i_{PR}$ is made to coincide with the final speed change ratio $i_{PO}$, but as the time constant varies according to the deviation $e_{iP}$, it is referred to as a variable.

Figure 5:
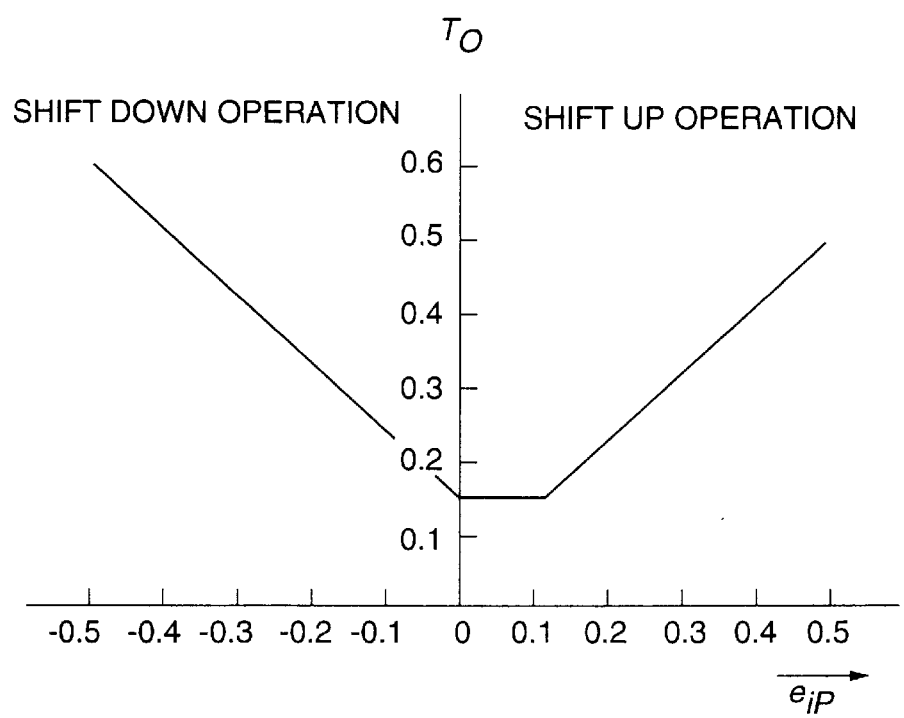
FIG. 5 is a diagram showing the contents of a map of a target dynamic characteristic coefficient TO with which the speed change ratio controller is provided.

The target dynamic characteristic variable $T_O$ is found by looking up a map which is shown in FIG. 5.

In this map, the target dynamic characteristic parameter $T_O$ is set so that a shift down operation is slower than a shift up operation. By modifying $T_O$, vehicle performance such as drivability or fuel consumption may be tuned.

In a step 108, a target speed change ratio $i_{PT}$ and command speed change ratio $i_{PC}$ are computed from the final speed change ratio $i_{PO}$, target dynamic characteristic parameter $T_O$ and a time constant $T_T$ representing the dynamic characteristics of the speed change ratio servo circuit 500, using the following equations (1) and (2).

$$i_{PTC} = i_{PO} \cdot \frac{1}{T_O \cdot s + 1} \quad (1)$$

where s=differential operator.

$$i_{PR} = i_{PC} \cdot \frac{1}{T_T \cdot s + 1} \quad (2)$$

where $T_T$=time constant of dynamic characteristics of speed change ratio servo device 500.

The command speed change ratio $i_{PC}$ is calculated by the following equation (3).

$$i_{PC} = i_{PO} \cdot \frac{T_T \cdot s + 1}{T_O \cdot s + 1} \quad (3)$$

Figure 6:
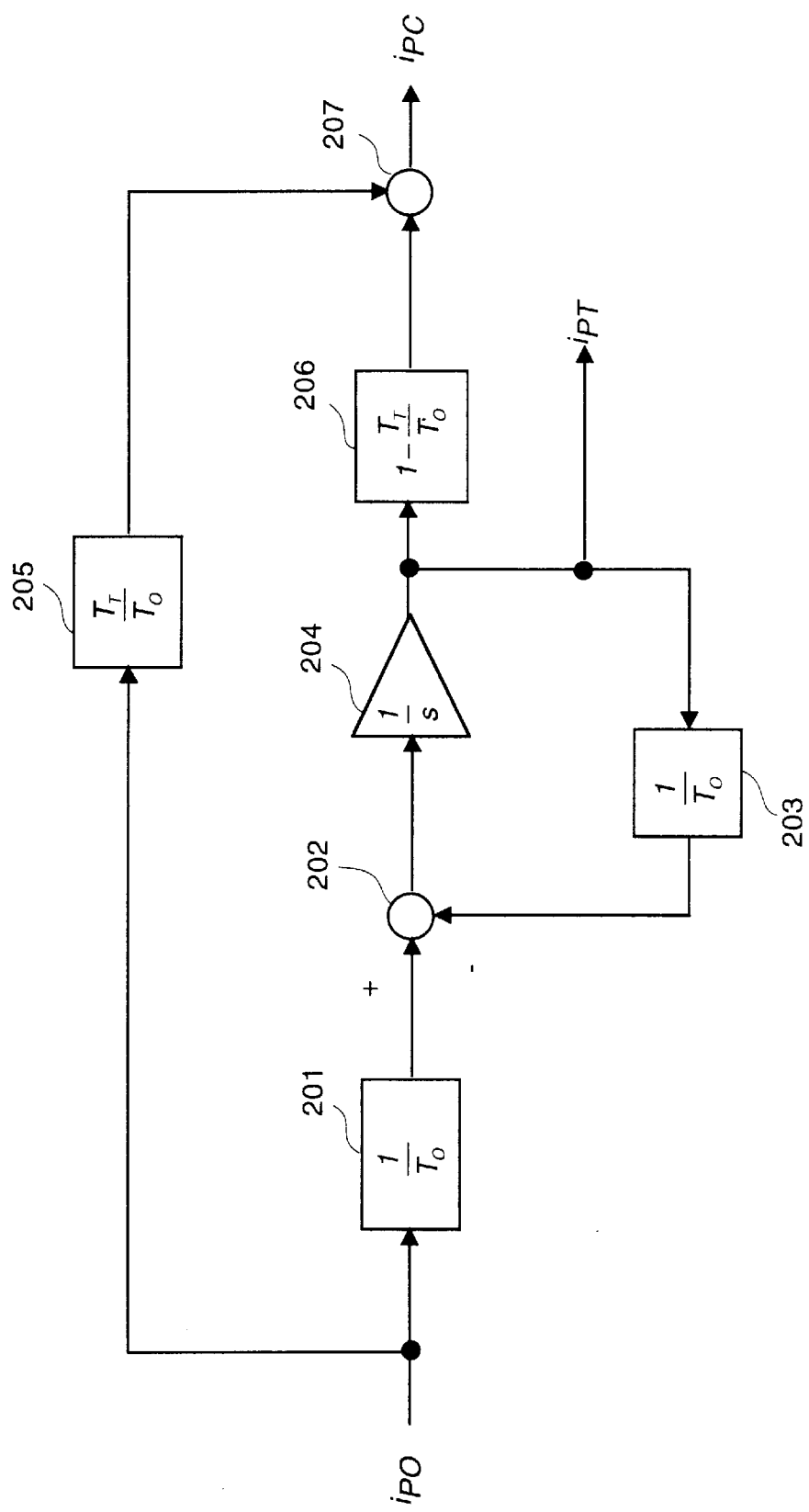
FIG. 6 is a block diagram showing the control performed by the speed change ratio controller.

FIG. 6 shows the above-mentioned calculation in the form of a block diagram. In this diagram, the input signal is the final speed change ratio $i_{PO}$, and the output signals are the target speed change ratio $i_{PT}$ and command speed change ratio $i_{PC}$. In this figure, a circuit comprising a compensator 201, summing junction 202, compensator 203 and integrator 204 corresponds to the aforesaid equation (1), and compensators 205, 206 and an adder 207 are equivalent to the aforesaid equation (3).

The command speed change ratio $i_{PC}$ found in this way reflects the dynamic characteristics of the target speed change ratio and dynamic characteristics of the speed change ratio servo device 500. In a step 109, this command speed change ratio $i_{PC}$ is output to the speed change ratio servo device 500.

The angle position of the step motor 113 and the speed change ratio of the continuously variable transmission are not in direct proportion. Therefore, the command speed change ratio $i_{PC}$ is converted to an angle position control signal of the step motor 113, and is output to the speed change ratio servo device 500 so that the command speed change ratio $i_{PC}$ is in direct proportion to the speed change ratio of the continuously variable transmission.

Figures 7A, 7B, 7C:
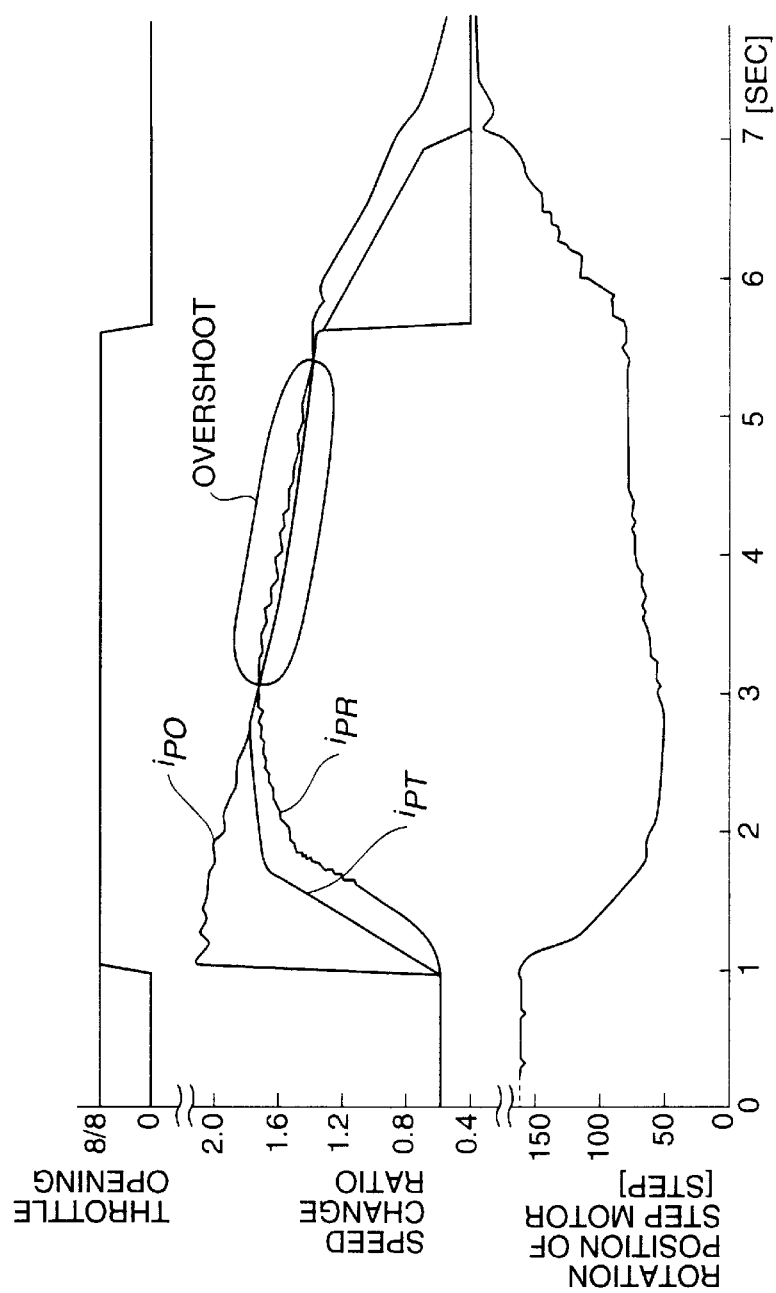
FIGS. 7A–7C are diagrams showing throttle openings, various speed change ratios and step motor angle position variations according to a prior art controller.
Figures 8A, 8B, 8C:
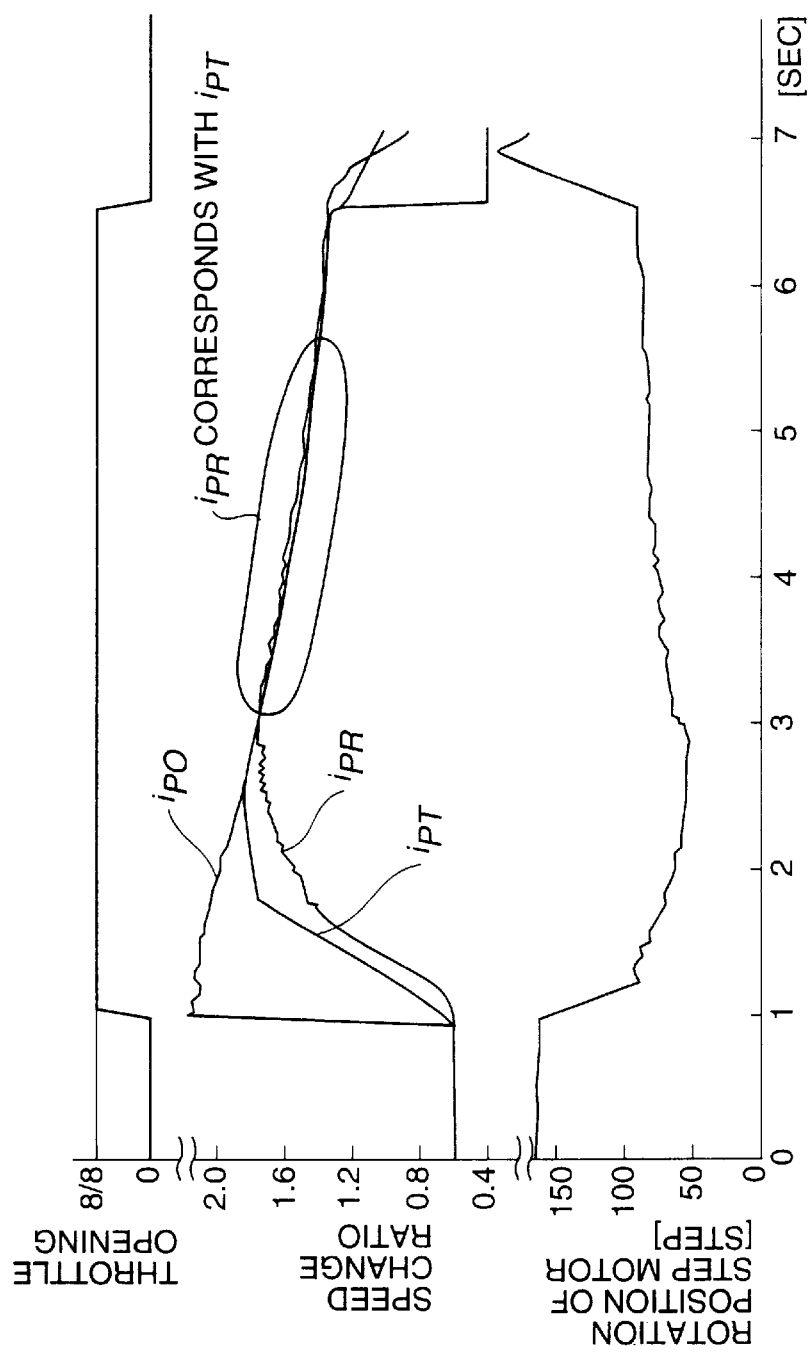
FIGS. 8A–8C are diagrams showing throttle openings, various speed change ratios and step motor angle position variations in the speed change ratio controller according to this invention.

FIGS. 7A–7C and FIGS. 8A–8C show the results of experiments performed in order to confirm the effect of this invention. This shows a so-called kick down speed change wherein the speed change ratio is reduced and the vehicle is accelerated by depressing the accelerator pedal. FIGS. 7A–7C relate to the aforesaid prior art speed control device, and FIGS. 8A–8C relate to the device according to this invention.

Comparing these experimental results, it was found that whereas the real speed change ratio $i_{PR}$ overshoots the target speed change ratio $i_{PT}$ according to the prior art device, in the speed controller according to this invention, the real speed change ratio $i_{PR}$ almost coincides with the target speed change ratio $i_{PT}$.

Hence, the real engine rotation speed does not overshoot the target engine rotation speed, and fuel cost-performance is improved, The corresponding structures, materials, acts, and equivalents of all means plus function elements in the claims below are intended to include any structure, material, or acts for performing the functions in combination with other claimed elements as specifically claimed.

The embodiments of this invention in which an exclusive property or privilege is claimed are defined as follows:

What is claimed is:

1. A speed change ratio controller for use with a continuously variable transmission of a vehicle, comprising:

a speed change ratio varying mechanism for varying a speed change ratio of the continuously variable transmission, a speed change ratio servo device for controlling said speed change ratio varying mechanism according to an input signal, means for setting a final speed change ratio according to a vehicle traveling condition, means for computing a deviation between said final speed change ratio and a target speed change ratio, means for setting a target dynamic characteristic parameter according to said deviation so as to make said real speed change ratio coincide with said final speed change ratio, means for computing said target speed change ratio and a command speed change ratio based on said final speed change ratio and said target dynamic characteristic parameter, and means for outputting a signal corresponding to said command speed change ratio to said speed change ratio servo circuit.

2. A speed change ratio controller for use with a continuously variable transmission of a vehicle, comprising:

a speed change ratio varying mechanism for varying a speed change ratio of the continuously variable transmission, a speed change ratio servo device for controlling said speed change ratio varying mechanism according to an input signal, and a microprocessor programmed to:

set a final speed change ratio according to a vehicle traveling condition, compute a deviation between said final speed change ratio and a target speed change ratio, set a target dynamic characteristic parameter according to said deviation so as to make said real speed change ratio coincide with said final speed change ratio, compute said target speed change ratio and a command speed change ratio based on said final speed change ratio and said target dynamic characteristic parameter, and output a signal corresponding to said command speed change ratio to said speed change ratio servo circuit.

3. A speed change ratio controller as defined in claim 1, wherein said microprocessor is further programmed to compute said target speed change ratio and command speed change ratio based on said final speed change ratio, said target dynamic characteristic parameter and transmission characteristics of said speed change ratio servo device.

4. A speed change ratio controller as defined in claim 1, wherein said microprocessor is further programmed to compute said command speed change ratio by multiplying a filter value specified by the following equation, by said final speed change ratio:

$$Gc(s) = \frac{T_T \cdot s + 1}{T_O \cdot s + 1}$$

where Gc(s)=filter value, $T_T$=constant expressing transmission characteristics of speed change ratio servo device, $T_O$=target dynamic characteristic parameter, s=differential operator.

5. A speed change ratio controller as defined in claim 1, wherein said microprocessor is further programmed to set said target dynamic characteristic parameter to a larger value during a speed change toward downshift than during a speed change toward upshift, for an identical deviation.

6. A speed change ratio controller as defined in claim 1, wherein said microprocessor is further programmed to calculate said final speed change ratio by dividing a target input rotation speed of said transmission by a real output rotation speed of said transmission.

7. A speed change ratio controller as defined in claim 6, wherein said speed change ratio controller further comprises a sensor for detecting a vehicle travel speed, and said microprocessor is further programmed to calculate said real output rotation speed by multiplying a predetermined constant by said vehicle travel speed.

* * * * *